United States Patent
van Stiphout et al.

(10) Patent No.: US 8,313,202 B2
(45) Date of Patent: Nov. 20, 2012

(54) HINGE CONSTRUCTION

(75) Inventors: Paulus Gerardus Maria van Stiphout, Woerden (NL); Peter Alexander Hamming, Houten (NL); Peter Jeroen Kerkhof, Zoetermeer (NL); Marinus Roose, Nieuwegein (NL); Marinus Jacobus Maria Van Zuijlen, Jaarsveld (NL)

(73) Assignee: MCi (Mirror Controls International) Netherlands B.V., Montfoort (NL)

( * ) Notice: Subject to any disclaimer, the term of this patent is extended or adjusted under 35 U.S.C. 154(b) by 722 days.

(21) Appl. No.: 12/300,538

(22) PCT Filed: May 14, 2007

(86) PCT No.: PCT/NL2007/050209
§ 371 (c)(1),
(2), (4) Date: Jun. 26, 2009

(87) PCT Pub. No.: WO2007/133077
PCT Pub. Date: Nov. 22, 2007

(65) Prior Publication Data
US 2009/0303625 A1 Dec. 10, 2009

(30) Foreign Application Priority Data
May 12, 2006 (NL) ...................................... 1031808

(51) Int. Cl.
*G02B 7/182* (2006.01)
(52) U.S. Cl. ..................................................... 359/872
(58) Field of Classification Search .................. 359/841, 359/872; 248/477–479
See application file for complete search history.

(56) References Cited

U.S. PATENT DOCUMENTS

| 6,022,113 | A  | * | 2/2000 | Stolpe et al. | ............... | 359/841 |
| 6,390,630 | B1 | * | 5/2002 | Ochs | ............... | 359/841 |

FOREIGN PATENT DOCUMENTS

| DE | 19833672 A1 | 5/1999 |
| EP | 0881124 A2 | 12/1998 |
| JP | 09039663 | 2/1997 |
| JP | 10129349 | 5/1998 |
| JP | 2005193818 A1 | 7/2005 |
| WO | WO 97/43144 A | 11/1997 |
| WO | WO 2005/075251 A | 8/2005 |

OTHER PUBLICATIONS

International Preliminary Report on Patentability for PCT/NL2007/050209, mailed Sep. 10, 2007.
International Search Report; PCT/NL2007/050209, mailed Aug. 4, 2008.
Machine Translation of JP09039663.
Machine Translation of JP2005-193818.

* cited by examiner

*Primary Examiner* — Stephone Allen
*Assistant Examiner* — Kimberly N Kakalec
(74) *Attorney, Agent, or Firm* — Dykema Gossett PLLC

(57) ABSTRACT

A hinge assembly for a wing mirror unit for a motor vehicle comprising a central shaft and a mirror housing pivotably arranged around the central shaft. In an embodiment, a bottom surface of the mirror housing is supported on a supporting surface at the base of the central shaft and, through cooperation, first and second run-on surfaces define a predetermined angular position between the central shaft and the mirror housing corresponding to a folded-out position of the mirror housing. In an embodiment, first run-on surfaces are provided on a side of the mirror housing remote from the supporting surface, and second run-on surfaces are connected with the central shaft to be axially compliant and rotation-coupled.

6 Claims, 3 Drawing Sheets

HINGE CONSTRUCTION

CROSS-REFERENCE TO RELATED APPLICATION

This application is a national stage filing based upon International PCT Application No. PCT/NL2007/050209, with an international filing date of May 14, 2007, which claims the benefit of priority to Netherlands Application No. 1031808, filed May 12, 2006, each of which is fully incorporated herein by reference as though fully set forth herein.

The invention relates to a hinge construction for a wing mirror unit for a motor vehicle, comprising a central shaft and a mirror housing pivotably arranged around the central shaft, wherein a bottom surface of the mirror housing is supported on a supporting surface at the foot of the central shaft, further comprising first and second run-on surfaces which through cooperation define a predetermined angular position between central shaft and mirror housing corresponding to a folded-out position of the mirror housing.

Such a hinge construction is generally known. Usually, the central shaft is provided with a baseplate as supporting surface. The first run-on surfaces are then realized by means of cams provided at the bottom surface of the mirror housing, while the second run-on surfaces are realized by means of cams which are provided on a baseplate of the central shaft.

The central shaft is usually fixedly attached, by way of the baseplate, to the body of the motor vehicle, so that the mirror housing in the folded-out position extends substantially transversely to the body of the motor vehicle.

By means of the hinge construction, the mirror housing can be pivoted rearwards from the folded-out position to a folded-in position, in which the mirror housing projects less far and extends in rearward direction more alongside the body.

Typically, the wing mirror unit comprises an electric drive with which the mirror housing is adjustable between the folded-in position and the folded-out position.

In the known hinge construction, the run-on surfaces cooperate against the action of a spring, and the drive is cut off by means of a cut-off circuit based on a current strength limitation when the run-on surfaces cooperate.

A disadvantage of the known hinge construction is that the bottom surface of the mirror housing and the supporting surface at the base of the central shaft can move apart in axial direction as a result of the cooperation of the run-on surfaces. In particular, this can happen as a result of deceleration when the drive is cut off. As a result, between mirror housing and supporting surface, a slit may be formed which causes wind noise. Furthermore, the support of the mirror housing may become less stable as a result, so that for instance a mirror glass carried by the mirror housing can give an undesired vibrating picture during driving. Also, the cams of the baseplate need to be able to resist a relatively high surface pressure, so that in practice, for reasons of strength, the baseplate is designed as a metal part, which is relatively costly.

The invention contemplates a hinge construction of the type mentioned in the opening paragraph hereof, with which the above disadvantages can be obviated. To that end, the hinge construction is characterized according to the invention in that the first run-on surfaces are carried on a side of the mirror housing remote from the supporting surface, in that the second run-on surfaces are connected with the central shaft so as to be axially compliant and rotation-coupled, and in that the supporting surface at the base of the central shaft and the bottom surface of the mirror housing supported thereon are free of run-on surfaces. By mounting the run-on surfaces on the side of the mirror housing remote from the supporting surface, slit formation between mirror housing and support plate as a result of the rise of the surfaces can be avoided, and actually the support of the mirror housing on the supporting surface can be enhanced. Wind noise and stability problems due to slit formation can thus be obviated. Furthermore, owing to the run-on surfaces being placed elsewhere, the contact surface between the bottom surface of the mirror housing and the supporting surface at the base of the central shaft can be larger, so that the mirror base can be manufactured from material having a lower maximum allowable surface pressure. As a result, the mirror base can for instance be manufactured from plastic material, which can be cheaper than metal.

The axial compliance can for instance be realized by providing the second run-on surfaces on a ring arranged around the central shaft so as to be axially slidable and rotation-coupled. The axial compliance of the ring can then be limited, for instance, by positioning the ring with a stroke limited in axial direction by a stop. The stop can then be fixed, or be under spring action. Alternatively, the ring can also be placed directly under axial spring action. Naturally, it is also possible to realize the axial compliance by deformation of the second run-on surfaces and/or their carrier.

The rotation coupling between the second run-on surfaces and the central shaft can be designed, for instance, as a rigid rotation coupling, but may also comprise a disengageable rotation coupling and/or a rotation coupling with a free stroke.

The axial compliance of the second run-on surfaces with respect to the central shaft when the run-on surfaces cooperate can be utilized to cut off the drive, for instance by establishing or breaking an electric contact.

Advantageously, a cam ring is provided, arranged around the hinge shaft so as to be axially movable and rotation-coupled, which cam ring is designed with a pattern of cams which is distributed irregularly along the circumference, which cam ring cooperates with a corresponding pattern of cams on the side of the bottom surface of the mirror housing that is remote from the supporting surface. The side surfaces of the cams on the cam ring and the mirror housing then form the first and second run-on surfaces, respectively. By providing a pattern of cams distributed irregularly along the circumference, what can be achieved is that the cam ring and the mirror housing can cooperate with each other only in one orientation. If desired, the run-on surfaces can then cooperate without a free stroke in rotational direction. Thus, the contact surface can be enlarged, so that the surface pressure on the run-on surfaces can be lower, and for instance plastic instead of metal can be used. The angular adjustment between the mirror housing and the central shaft can then be limited, for instance, by means of stop cams without run-on surfaces, which cooperate with the cam ring.

It is noted that a pattern of cams irregularly distributed along the circumference can in itself already be used advantageously in a hinge construction where the first run-on surfaces are realized by means of cams provided at the bottom surface of the mirror housing and the second run-on surfaces are realized by means of cams provided on a baseplate of the central shaft.

Further advantageous embodiments of the invention are set forth in the subclaims.

The invention will be further elucidated on the basis of two exemplary embodiments which are represented in the drawing. In the drawing.

Figure 1:
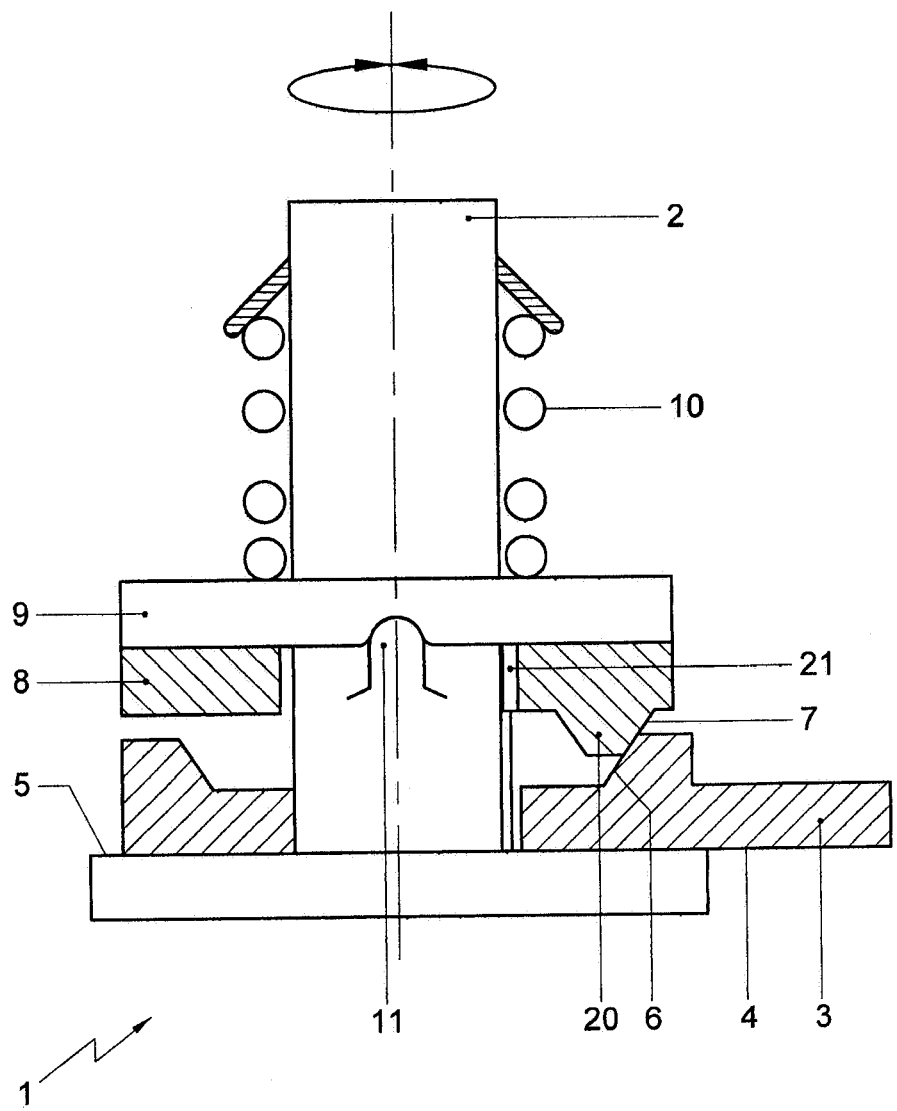
FIG. 1 shows a schematic side view of a first embodiment of a hinge construction according to the invention.

The figures are only schematic exemplary embodiments of preferred embodiments of the invention and are given by way of non-limiting exemplary embodiments.

In the drawing, the same or corresponding parts are designated with the same reference numerals.

FIG. 1 shows a hinge construction 1 for a wing mirror unit for a motor vehicle. The hinge construction 1 comprises a central shaft 2 and a mirror housing 3 arranged around the central shaft 2 so as to be pivotable in the direction of the double arrow P1. The bottom surface 4 of the mirror housing 3 is supported on a supporting surface 5 at the base of the central shaft 2.

The hinge construction 1 furthermore comprises first run-on surfaces 6 and second run-on surfaces 7 which through cooperation define a predetermined angular position between central shaft 2 and mirror housing 3, corresponding to a folded-out position of the mirror housing. In FIG. 1 the hinge construction 1 is shown in the folded-out position.

The first run-on surfaces 6 are provided on a side of the bottom of the mirror housing 3 remote from the supporting surface. The second run-on surfaces 7 are connected with the central shaft 2 in an axially compliant and rotation-coupled fashion. The supporting surface 5 at the base of the central shaft 2 and the bottom surface 4 of the mirror housing supported thereon are free of run-on surfaces. Supporting surface and bottom surface cooperate directly and slitlessly as substantially flat surfaces.

In the exemplary embodiment represented here, axial compliance is realized by providing the second run-on surfaces 7 on cam 20 carried by a ring 8 arranged around the central shaft 2 so as to be axially slidable and rotation-coupled via keyways 21. The displacement of the ring has been limited by positioning ring 8 with a stroke which is limited in axial direction by a stop 9. The stop is under the action of helical spring 10 arranged around the central shaft 2. In this exemplary embodiment, the stop 9 is supported on the central shaft 2 by means of a support 11.

During the adjustment between the folded-in position and the folded-out position, the mirror housing 3 is not supported on the supporting surface 5 under spring action, so that adjustment requires little driving force. Upon reaching the folded-out position, the run-on surfaces cooperate, and the ring 8 moves axially along the central shaft 2 in upward direction as far as the stop 9.

Further upward movement is checked by the stop 9 being under spring action. As a result, the mirror housing 3 in the folded-out position is supported under spring action on the supporting surface 5.

When an electric drive is used, the drive can for instance be cut off by means of a cut-off circuit based on current strength limitation when the run-on surfaces cooperate. Alternatively, the axially upward movement of the ring 8 can be utilized to cut off the electric drive by establishing or breaking an electric contact.

Figure 2:
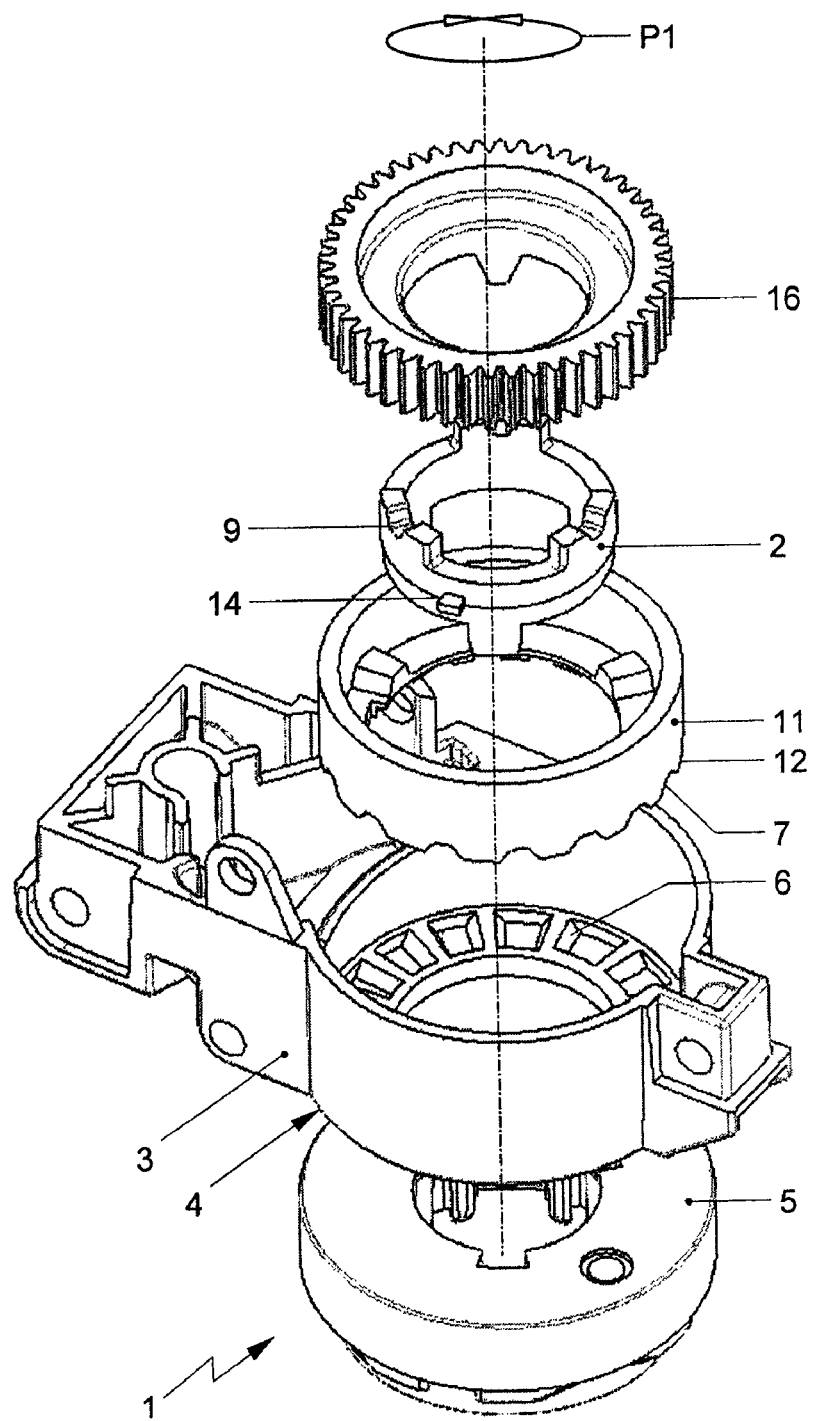
FIG. 2 shows a schematic perspective view of a second embodiment of a hinge construction according to the invention in disassembled condition.
Figure 3:
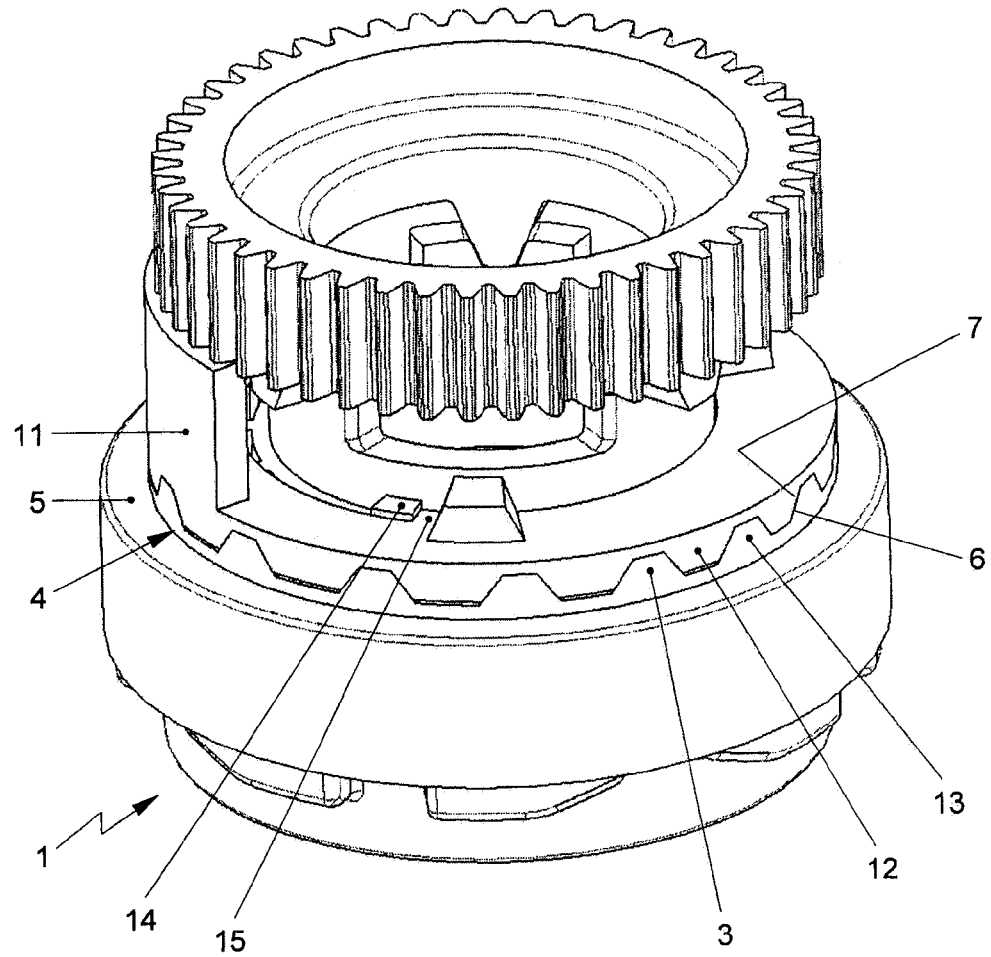
FIG. 3 shows a perspective view of the hinge construction of FIG. 2 in assembled condition.

Referring to FIG. 2, there is shown a second embodiment which is designed with a cam ring 11. The cam ring 11 is arranged around the central shaft 2 so as to be axially sidable and rotation-coupled, with a free stroke. The cam ring 11 is designed with a pattern of cams 12 distributed irregularly along the circumference. The cam ring 11 cooperates with a corresponding pattern of cams 13 on the side of the bottom surface 4 of the mirror housing 3 remote from the supporting surface 5. The side surfaces of the cams 12, 13 on the cam ring 11 and the mirror housing 3 form the first run-on surfaces 6 and the second run-on surfaces 7, respectively. By the use of the pattern of cams distributed irregularly along the circumference, cam ring 11 and mirror housing 3 can cooperate with each other only in one orientation. In this exemplary embodiment, the run-on surfaces cooperate without free stroke in rotational direction. By the use of such a cam ring, the contact surface can be enlarged, so that the surface pressure can be relatively low.

The cam ring is rotation-coupled, with a free stroke, to the central shaft 2. The angular adjustment between mirror housing 3 and central shaft 2, upon reaching the folded-out position, is limited by stop cams 14, 15 which are designed without run-on surfaces. Then, as in the exemplary embodiment discussed above, due to the rise of the run-on surfaces 7 the cam ring 11 will move upwards in axial direction until it comes into contact with a stop. In this exemplary embodiment, the stop is designed as a gear wheel 16 supported under spring action on a support 11. In this exemplary embodiment, the central shaft 2 is designed as an outer shell received in the support surface 5. Through this outer shell, an auxiliary shaft can be inserted for carrying the spring, which auxiliary shaft may be provided with a baseplate. It will be clear that support surface, outer shell and any auxiliary shaft may also, if desired, be integrated into a single part.

It is noted that the invention is not limited to the exemplary embodiments represented here. Many variations are possible within the scope of the invention as set forth in the following claims.

The invention claimed is:

1. A hinge assembly for a wing mirror unit for a motor vehicle, the hinge assembly comprising:
   a central shaft including a base and a supporting surface at the base; and
   a mirror housing pivotably arranged around the central shaft, the mirror housing having a bottom surface configured to be supported on the supporting surface;
   wherein the mirror housing includes a first run-on surface on a side of the mirror housing remote from the supporting surface; the assembly includes a second run-on surface connected with the central shaft so as to be axially compliant and rotation-coupled; the first and second run-on surfaces cooperate to define a predetermined angular position between the central shaft and mirror housing corresponding to a folded-out position of the mirror housing; and the axial compliance of the first and second run-on surfaces or their respective components relative to the central shaft upon cooperation of the first and second run-on surfaces establishes or breaks an electric contact.

2. The hinge assembly according to claim 1, wherein the second run-on surface is provided or carried on a ring arranged around the central shaft so as to be axially slidable and rotation-coupled.

3. The hinge assembly according to claim 2, the assembly including a stop that limits the stroke of the ring in an axial direction.

4. The hinge assembly according to claim 3, wherein the ring or the stop is under an axial spring force.

5. The hinge assembly according to claim 1, wherein the rotation coupling between the first run-on surface and the central shaft comprises a rotation-coupling with a free stroke.

6. The hinge assembly according to claim 1, the assembly including a cam ring that is arranged about the central shaft to be axially slidable and rotation-coupled, the cam ring including a pattern of cams distributed irregularly along the circumference that cooperate with a corresponding pattern of cams provided on the side of the bottom surface of the mirror housing remote from the supporting surface, and wherein the side surfaces of the cams on the mirror housing form the first run-on surfaces and the side surfaces of the cams on the ring form the second run-on surfaces.

* * * * *